(12) United States Patent
Van De Plas et al.

(10) Patent No.: US 10,518,601 B2
(45) Date of Patent: Dec. 31, 2019

(54) DAMPER WITH INTERNAL HYDRAULIC STOP

(71) Applicant: Tenneco Automotive Operating Company Inc., Lake Forest, IL (US)

(72) Inventors: Jelle Van De Plas, Nieuwrode (BE); Victor Zuanazzi, Sint Gillis (BE); Kenny Motte, Kampenhout (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 15/966,056

(22) Filed: Apr. 30, 2018

(65) Prior Publication Data

US 2019/0329623 A1 Oct. 31, 2019

(51) Int. Cl.
| | |
|---|---|
| *F16F 9/342* | (2006.01) |
| *B60G 17/08* | (2006.01) |
| *B60G 13/08* | (2006.01) |
| *F16F 9/19* | (2006.01) |
| *F16F 9/58* | (2006.01) |

(Continued)

(52) U.S. Cl.
CPC .............. *B60G 17/08* (2013.01); *B60G 13/08* (2013.01); *F16F 9/19* (2013.01); *F16F 9/342* (2013.01); *F16F 9/5126* (2013.01); *F16F 9/585* (2013.01); *B60G 2206/41* (2013.01);

(Continued)

(58) Field of Classification Search
CPC .. F16F 9/19; F16F 9/342; F16F 9/5126; F16F 9/585; F16F 9/064; F16F 2228/066; B60T 17/08

See application file for complete search history.

(56) References Cited

U.S. PATENT DOCUMENTS

| | | |
|---|---|---|
| 3,180,453 A | 4/1965 | Murata |
| 3,232,390 A | 2/1966 | Chano |

(Continued)

FOREIGN PATENT DOCUMENTS

| | | |
|---|---|---|
| DE | 102004001743 A1 | 8/2004 |
| EP | 1496285 A2 | 1/2005 |

(Continued)

OTHER PUBLICATIONS

International Search Report and Written Opinion received in related PCT/US2019/027457 dated Aug. 2, 2019.

*Primary Examiner* — Thomas W Irvin

(74) *Attorney, Agent, or Firm* — Harness, Dickey & Pierce, P.L.C.

(57) ABSTRACT

A damper system for a vehicle including a pressure tube and a piston assembly. A stroke dependent damper assembly is coupled to a piston rod at a position below the piston assembly. A free floating piston positioned in an internal cavity of the stroke dependent damper assembly is longitudinally moveable between retracted, middle, and extended positions. A metering pin extends from the floating piston into a through-bore in a distal end of the stroke dependent damper assembly. An orifice is defined between an inner surface of the through-bore and an outer surface of the metering pin. Longitudinal movement of the floating piston changes the position of the metering pin in the through-bore, which changes the size of the orifice. Fluid flow through the orifice is restricted when the orifice size decreases, which slows down the movement of the floating piston as it approaches the retracted and extended positions.

18 Claims, 8 Drawing Sheets

(51) Int. Cl.
*F16F 9/512* (2006.01)
*F16F 9/06* (2006.01)

(52) U.S. Cl.
CPC ......... *B60G 2500/112* (2013.01); *F16F 9/064* (2013.01); *F16F 2228/066* (2013.01)

(56) References Cited

U.S. PATENT DOCUMENTS

| | | | |
|---|---|---|---|
| 3,379,286 | A | 4/1968 | Takagi |
| 3,570,635 | A | 3/1971 | Takagi |
| 4,765,446 | A | 8/1988 | Murate et al. |
| 4,874,066 | A | 10/1989 | Silberstein |
| 4,953,671 | A | 9/1990 | Imaizumi |
| 5,058,715 | A | 10/1991 | Silberstein |
| 5,248,014 | A | 9/1993 | Ashiba |
| 5,505,225 | A | 4/1996 | Niakan |
| 6,220,409 | B1 | 4/2001 | Deferme |
| 6,918,473 | B2 | 7/2005 | Deferme |
| 7,100,750 | B2 * | 9/2006 | Drees ............... F16F 9/5126 188/280 |
| 8,590,677 | B2 | 11/2013 | Kim |
| 8,651,252 | B2 * | 2/2014 | Katayama ............ F16F 9/3484 188/282.6 |
| 8,695,766 | B2 | 4/2014 | Yamashita et al. |
| 8,833,532 | B2 | 9/2014 | Yamashita |
| 8,844,687 | B2 | 9/2014 | Yu et al. |
| 9,239,092 | B2 | 1/2016 | Nowaczyk et al. |
| 9,291,231 | B2 | 3/2016 | Kim et al. |
| 9,541,153 | B2 | 1/2017 | Park |
| 2015/0144444 | A1 | 5/2015 | Lim |
| 2016/0025180 | A1 | 1/2016 | Fukushima et al. |
| 2016/0288604 | A1 | 10/2016 | Teraoka et al. |
| 2016/0288605 | A1 | 10/2016 | Teraoka et al. |

FOREIGN PATENT DOCUMENTS

| | | |
|---|---|---|
| EP | 1788276 A2 | 5/2007 |
| JP | 5851159 B2 | 2/2016 |
| JP | 5981800 B2 | 8/2016 |
| KR | 101272755 B1 | 6/2013 |
| WO | 2015082147 A1 | 6/2015 |
| WO | 2017125478 A1 | 7/2017 |

* cited by examiner

DAMPER WITH INTERNAL HYDRAULIC STOP

FIELD

The present disclosure relates to automotive shock absorbers/dampers. More particularly, the present disclosure relates to shock absorbers/dampers that provide a different magnitude of damping based on a length of a stroke of the shock absorber/damper.

BACKGROUND

The statements in this section merely provide background information related to the present disclosure and may not constitute prior art.

Shock absorbers are typically used in conjunction with automotive suspension systems or other suspension systems to absorb unwanted vibrations that occur during movement of the suspension system. In order to absorb these unwanted vibrations, automotive shock absorbers are generally connected between the sprung (body) and the unsprung (suspension/drivetrain) masses of the vehicle.

In typical shock absorbers, a piston is located within a fluid chamber defined by a pressure tube and is connected to the sprung mass of the vehicle through a piston rod. The pressure tube is connected to the unsprung mass of the vehicle. The piston divides the fluid chamber of the pressure tube into an upper working chamber and a lower working chamber. The piston includes compression valving that limits the flow of hydraulic fluid from the lower working chamber to the upper working chamber during a compression stroke. The piston also includes rebound valving that limits the flow of hydraulic fluid from the upper working chamber to the lower working chamber during a rebound or extension stroke. By controlling the fluid flow between the two working chambers, a pressure drop is built up between the two working chambers. Because the compression valving and the rebound valving each has the ability to limit the flow of hydraulic fluid, the shock absorber is able to produce damping forces that counteract oscillations/vibrations, which would otherwise be transmitted from the unsprung mass to the sprung mass.

Typical shock absorbers provide the same magnitude of damping force regardless of the length of a damper stroke. However, shock absorbers have been developed where the magnitude of the damping force generated by the shock absorber during smaller damper strokes is different from the magnitude of the damping force generated by the shock absorber during larger damper strokes. These multi-force shock absorbers provide a relatively small or low damping force during the normal running of the vehicle and a relatively large or high damping force during maneuvers requiring extended suspension movements. The normal running of the vehicle is accompanied by small or fine vibrations of the un-sprung mass of the vehicle and thus the need for a soft ride or low damping characteristic of the suspension system to isolate the sprung mass from these small or fine vibrations. During a turning or braking maneuver, as an example, the sprung mass of the vehicle will attempt to undergo a relatively slow and/or large vibration, which then requires a firm ride or high damping characteristic of the suspension system to support the sprung mass and provide stable handling characteristics to the vehicle. Thus, these multi-force shock absorbers offer the advantage of a smooth steady state ride by eliminating the high frequency/small excitations from the sprung mass, while still providing the necessary damping or firm ride for the suspension system during vehicle maneuvers causing larger excitations of the sprung mass.

One such multi-force shock absorber is disclosed in U.S. Pat. No. 6,220,409, which is also assigned to Tenneco Automotive Inc. This shock absorber provides two stages of damping (hard and soft) by utilizing a stroke dependent damper assembly that is mounted to the piston rod below the main piston assembly. The stroke dependent damper assembly includes a piston that is longitudinally moveable between two rubber travel stops. These resilient travel stops act as mechanical stops for the piston when the piston reaches its travel extremes. When the piston hits one of these resilient travel stops, especially during a rebound stroke, a pressure wave can be created in the hydraulic fluid of the shock absorber that can vibrate the piston rod and cause noise.

Accordingly, there remains a need in the marketplace for stroke dependent shock absorbers with improved noise, vibration, and harshness.

SUMMARY

This section provides a general summary of the disclosure, and is not a comprehensive disclosure of its full scope or all of its features.

In accordance with one aspect of the subject disclosure, a damper system for a vehicle is provided. The damper system includes a pressure tube and a first piston assembly that is slidably fitted in the pressure tube. A piston rod extends within the pressure tube along a longitudinal axis and the first piston assembly is coupled to the piston rod. The pressure tube contains a hydraulic fluid and the first piston assembly separates the pressure tube into a first working chamber and a second working chamber. The first piston assembly includes a first valve assembly. The first valve assembly operates to control flow of the hydraulic fluid between the first working chamber and the second working chamber.

The damper system also includes a stroke dependent damper assembly. The stroke dependent damper assembly includes a proximal end, a distal end, a damper housing, an internal cavity positioned between the proximal and distal ends, and a floating piston slidably received in the internal cavity. The damper housing is coupled to the piston rod at the proximal end of the stroke dependent damper assembly. The floating piston is unbiased and free floating in the internal cavity and is moveable along the longitudinal axis between a retracted position, an intermediate position, and an extended position. The distal end of the stroke dependent damper assembly is opposite the proximal end of the stroke dependent damper assembly. The distal end of the stroke dependent damper assembly has an end wall that is fixed relative to the damper housing. The end wall includes a through-bore and the floating piston has a metering pin that is received in the through-bore of the end wall to define an orifice between an inner surface of the through-bore and an outer surface of the metering pin. Longitudinal movement of the floating piston between the retracted, middle, and extended positions changes the position of the metering pin in the through-bore, which changes the size of the orifice.

In operation, the floating piston remains near the intermediate position during smaller damper strokes. When the floating piston is near the intermediate position, the orifice size is large and fluid flows freely into and out of the digital chamber in the stroke dependent damper assembly. As a result, the damping is low during smaller damper strokes for improved ride comfort. During larger damper strokes, fluid flow in the internal cavity of the stroke dependent damper assembly pushes the floating piston towards the retracted position or the extended position. When the floating piston approaches these positions, the orifice size and therefore fluid flow into or out of the digital chamber of the stroke dependent damper assembly decreases, which slows down the longitudinal movement of the floating piston. As a result, the amount of damping progressively increases as the floating piston approaches the retracted and extended positions. In addition, because the speed of the floating piston is hydraulically controlled to slow down gradually as the floating piston approaches the retracted and extended positions, a "soft, hydraulic stop" for the floating piston is created. This reduces pressure waves inside the damper system that would otherwise be generated when the floating piston hits a "mechanical stop" at the retracted or extended positions. Noise, vibration, and harshness is therefore improved because pressure waves inside the damper system, which can vibrate the piston rod, are reduced.

Further areas of applicability and advantages will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
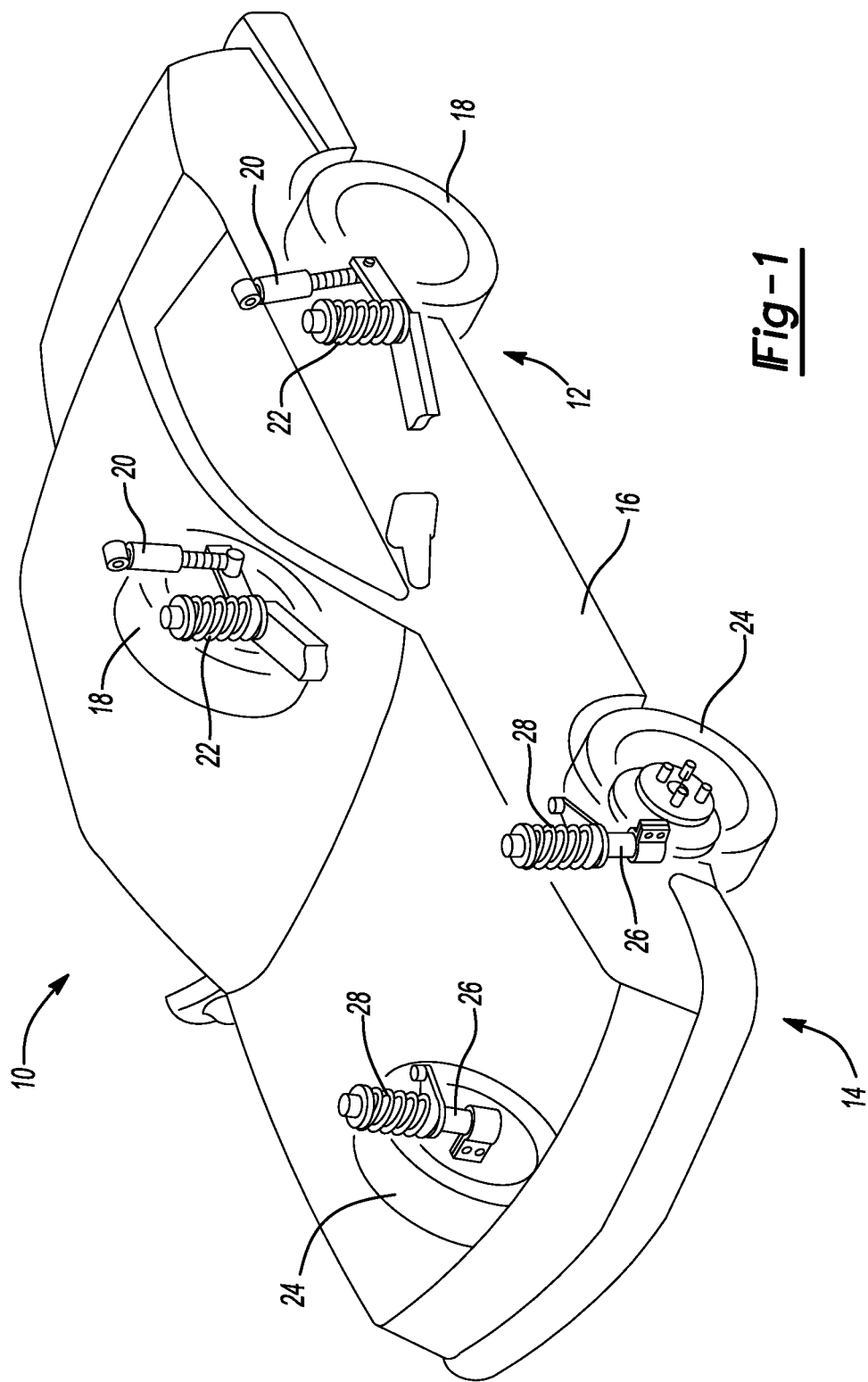
FIG. 1 is an illustration of an exemplary vehicle equipped with four shock absorbers constructed in accordance with the teachings of the present disclosure.

The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to FIG. 1, a vehicle 10 including a rear suspension 12, a front suspension 14, and a body 16 is illustrated. The rear suspension 12 has a transversely extending rear axle assembly (not shown) adapted to operatively support the vehicle's rear wheels 18. The rear axle assembly is operatively connected to the body 16 by a pair of shock absorbers 20 and a pair of helical coil springs 22. Similarly, front suspension 14 includes a transversely extending front axle assembly (not shown) to operatively support the vehicle's front wheels 24. The front axle assembly is operatively connected to body 16 by a second pair of shock absorbers 26 and by a pair of helical coil springs 28. Shock absorbers 20 and 26 serve to dampen the relative motion of the unsprung portion (i.e., front and rear suspensions 14 and 12, respectively) and the sprung portion (i.e., body 16) of vehicle 10. While the vehicle 10 has been depicted as a passenger car having front and rear axle assemblies, shock absorbers 20 and 26 may be used with other types of vehicles or machinery, or in other types of applications such as vehicles incorporating independent front and/or independent rear suspension systems. Further, the term "shock absorber" as used herein is meant to refer to shock absorbers and shock absorber systems in general and thus will include MacPherson struts. It should also be appreciated that the scope of the subject disclosure is intended to include shock absorber systems for stand-alone shock absorbers 20 and coil-over shock absorbers 26.

Figure 2:
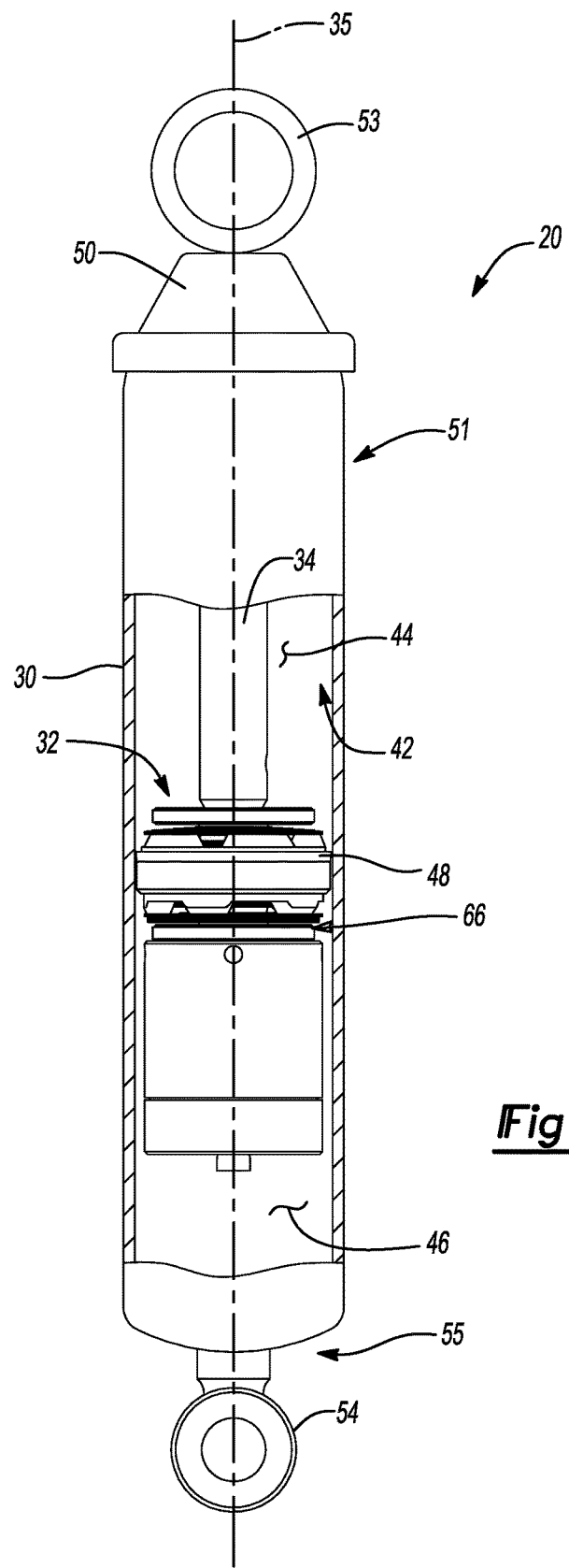
FIG. 2 is a side section view of a shock absorber constructed in accordance with the teachings of the present disclosure.

With additional reference to FIG. 2, shock absorber 20 is shown in greater detail. Shock absorber 20 comprises a pressure tube 30, a first piston assembly 32, and a piston rod 34. The pressure tube 30 and the piston rod 34 extend co-axially along a longitudinal axis 35. Pressure tube 30 defines an inner cavity 42. The first piston assembly 32 is slidably disposed within the inner cavity 42 of the pressure tube 30 and divides the inner cavity 42 into a first working chamber 44 and a second working chamber 46. A seal 48 is disposed between the first piston assembly 32 and pressure tube 30 to permit sliding movement of the first piston assembly 32 with respect to pressure tube 30 without generating undue frictional forces as well as sealing the first working chamber 44 from the second working chamber 46.

Piston rod 34 is attached to the first piston assembly 32 and extends through the first working chamber 44 and through an upper end cap 50 which closes a first end 51 of the pressure tube 30. An attachment end 53 of piston rod 34 opposite to first piston assembly 32 is connected to the body 16 of the vehicle 10 (i.e., the sprung portion of vehicle 10). Pressure tube 30 is filled with a hydraulic fluid and includes an attachment fitting 54 at a second end 55 of the pressure tube 30 that is connected to the unsprung portion of the suspension 12 and 14. The first working chamber 44 is thus positioned between the first end 51 of the pressure tube 30 and the first piston assembly 32 and the second working chamber 46 is positioned between the second end 55 of the pressure tube 30 and the first piston assembly 32. Suspension movements of the vehicle 10 will cause extension/rebound or compression movements of first piston assembly 32 with respect to pressure tube 30. Valving within first piston assembly 32 controls the movement of hydraulic fluid between the first working chamber 44 and the second working chamber 46 during movement of the first piston assembly 32 within pressure tube 30. Optionally, the shock absorber 20 may include a gas chamber defined by a floating piston (not shown) positioned in the pressure tube 30 to compensate for volume changes inside the first working chamber 44 as a result of the volume of the piston rod 34 that is inserted or taken out of the first working chamber 44 due to movements of the piston rod 34 during compression and rebound strokes of the shock absorber 20.

It should be appreciated that the shock absorber 20 may be installed in a reverse orientation, where the attachment end 53 of the piston rod 34 is connected to the unsprung portion of the suspension 12 and 14 and the attachment fitting 54 is connected to the body 16 (i.e., the sprung portion of vehicle 10). While FIG. 2 shows only shock absorber 20, it is to be understood that shock absorber 26 only differs from shock absorber 20 in the way in which it is adapted to be connected to the sprung and unsprung portions of vehicle 10 and the mounting location of the coil spring 28 relative to the shock absorber 26.

Figure 3:
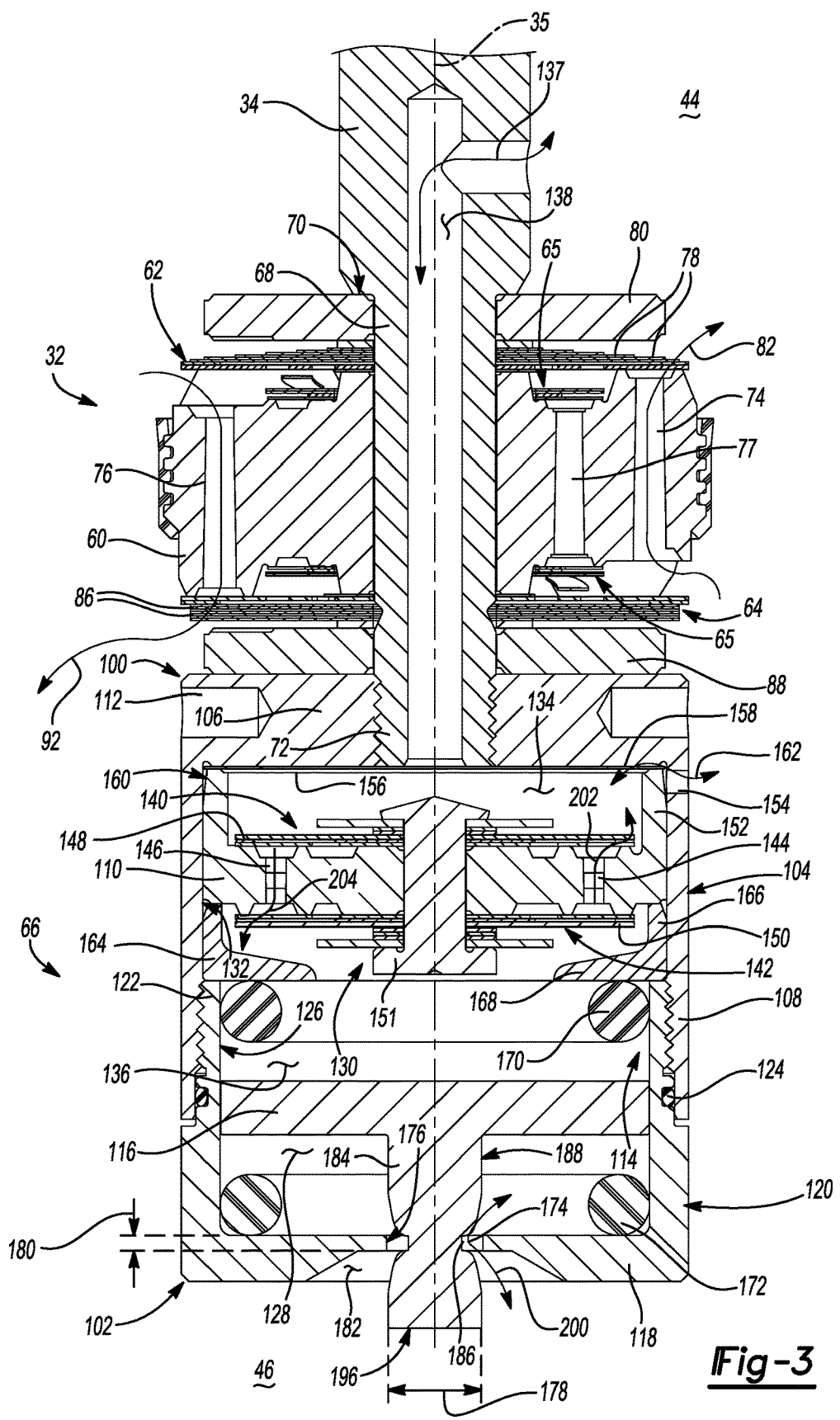
FIG. 3 is a side cross-sectional view depicting the piston assembly and stroke dependent damper assembly of the shock absorber shown in FIG. 2.
Figure 4:
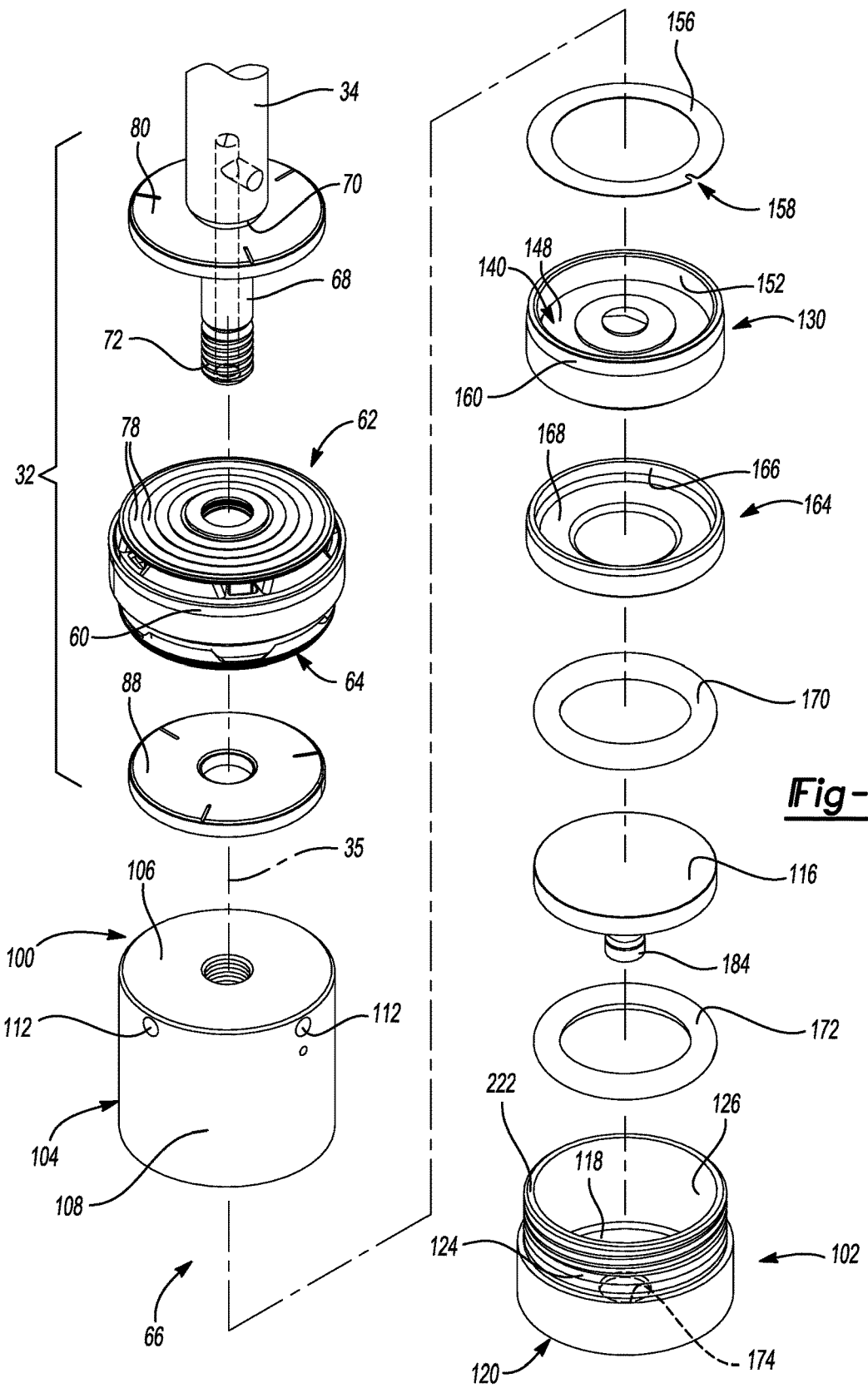
FIG. 4 is an exploded perspective view depicting the piston assembly and stroke dependent damper assembly of the shock absorber shown in FIG. 2.

With additional reference to FIGS. 3 and 4, the first piston assembly 32 comprises a piston body 60 that is attached to piston rod 34, a compression valve 62, a rebound valve 64, and one or more bleed valves 65. The shock absorber 20 also includes a stroke dependent damper assembly 66 that is mounted to the piston rod 34. Piston rod 34 includes a reduced diameter section 68 located on the end of the piston rod 34 that is disposed within pressure tube 30 such that the reduced diameter section 68 forms a shoulder 70 that abuts the first piston assembly 32. Piston body 60 is located on reduced diameter section 68 with the compression valve 62 located longitudinally between piston body 60 and shoulder 70 and the rebound valve 64 located longitudinally between piston body 60 and a threaded end 72 of the piston rod 34. Piston body 60 defines one or more compression flow passages 74, one or more rebound flow passages 76, and one or more bleed flow passages 77. In the illustrated example, the bleed flow passages 77 extend longitudinally through the piston body 60 at positions located radially inward of the compression flow passages 74 and the rebound flow passages 76. The compression valve 62 operates to control fluid flow of the hydraulic fluid through the compression flow passages 74 in the piston body 60, the rebound valve 64 operates to control fluid flow of the hydraulic fluid through the rebound flow passages 76 in the piston body 60, and the bleed valves 65 operate to control fluid flow of the hydraulic fluid through the bleed flow passages 77 in the piston body 60. Therefore, the compression, rebound, and bleed valves 62, 64, 65 control fluid flow between the first and second working chambers 44, 46 and thus cooperate to form a first valve assembly 62, 64, 65.

Compression valve 62 comprises a plurality of compression valve plates 78 and a first support washer 80. The compression valve plates 78 are disposed adjacent to piston body 60 to close the compression flow passages 74. During a compression stroke of shock absorber 20, fluid pressure builds up in the second working chamber 46 until the fluid pressure applied to the compression valve plates 78, through the compression flow passages 74, overcomes the load required to deflect the plurality of compression valve plates 78. The compression valve plates 78 elastically deflect to open the compression flow passages 74 and allow the hydraulic fluid to flow from the second working chamber 46 to the first working chamber 44 as shown by arrow 82 in FIG. 3. The first support washer 80 is disposed between the compression valve plates 78 and the shoulder 70 to limit the deflection of the compression valve plates 78.

Rebound valve 64 comprises a plurality of rebound valve plates 86 and a second support washer 88. The rebound valve plates 86 are disposed adjacent to piston body 60 to close the rebound flow passages 76. During an extension or rebound stroke of the shock absorber 20, fluid pressure builds up in the first working chamber 44 until the fluid pressure applied to the rebound valve plates 86, through the rebound flow passages 76, overcomes the load required to deflect rebound valve plates 86. The plurality of rebound valve plates 86 elastically deflect thereby opening the rebound flow passages 76 to allow the hydraulic fluid to flow from the first working chamber 44 to the second working chamber 46 as shown by arrow 92 in FIG. 3. The support washer 88 is positioned longitudinally between the frequency dependent damper assembly 66 and the plurality of rebound valve plates 86 to limit the deflection of the rebound valve plates 86. The support washer 88 extends annularly about the reduced diameter section 68 of the piston rod 34. Therefore, the plurality of rebound valve plates 86 are clamped between the support washer 88 and the piston body 60 when the stroke dependent damper assembly 66 is threaded onto the threaded end 72 of the piston rod 34.

The entire stroke dependent damper assembly 66 translates with the first piston assembly 32 along the longitudinal axis 35 during rebound/extension and compression movements of the piston rod 34 because the first piston assembly 32 and the stroke dependent damper assembly 66 are both fixed to piston rod 34 after assembly. The stroke dependent damper assembly 66 has a smaller outer diameter than the first piston assembly 32. As a result, the stroke dependent damper assembly 66 is spaced radially inward of and does not seal against the pressure tube 30.

The stroke dependent damper assembly 66 extends longitudinally between a proximal end 100 and a distal end 102. Accordingly, the distal end 102 is positioned opposite the proximal end 100. The stroke dependent damper assembly 66 includes a damper housing 104 having a base portion 106 and an extension portion 108. The base portion 106 of the damper housing 104 extends radially inwardly from the extension portion 108 and is coupled to the piston rod 34 at the distal end 102 of the stroke dependent damper assembly 66. Optionally, the damper housing 104 may include a tool interface 112 to facilitate the assembly operation of threading the damper housing 104 onto the threaded end 72 of the piston rod 34.

Figure 8:
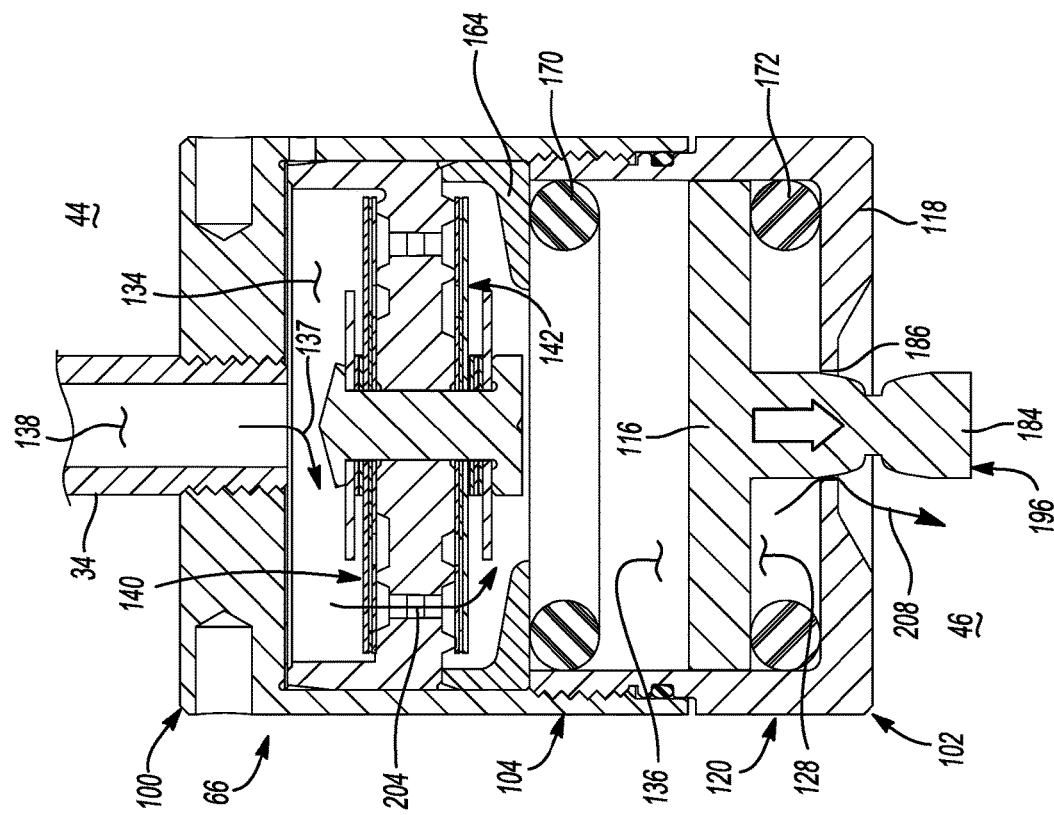
FIG. 8 is a side cross-sectional view depicting the stroke dependent damper assembly of the shock absorber shown in FIG. 2 where the floating piston of the stroke dependent damper assembly is shown approaching an extended position.

The stroke dependent damper assembly 66 includes an internal cavity 114 that is positioned longitudinally between the proximal and distal ends 100, 102. A floating piston 116 is slidably received in the internal cavity 114. The floating piston 116 is moveable within the internal cavity 114 along the longitudinal axis 35 between a retracted position (FIG. 7), an intermediate position (FIG. 6), and an extended position (FIG. 8). The floating piston 116 is unbiased and free floating in the internal cavity 114 meaning that there are no biasing members that apply a biasing force to the floating piston 116.

The distal end 102 of the stroke dependent damper assembly 66 has an end wall 118 that is fixed in place relative to the damper housing 104. In other words, the end wall 118 does not move longitudinally relative to the damper housing 104 after the stroke dependent damper assembly 66 is assembled. The end wall 118 is positioned in direct contact with the hydraulic fluid in the second working chamber 46 and forms part of an outer boundary of the stroke dependent damper assembly 66. Although other configurations are possible, in the illustrated example, the end wall 118 is part of an end cap 120 that is coupled to the damper housing 104. In this configuration, the end cap 120 and the damper housing 104 cooperate to define the internal cavity 114 of the stroke dependent damper assembly 66.

The end cap 120 may be coupled to the damper housing 104 in a number of different ways, including, without limitation, by a threaded connection or spot welding. Although material selection for the various components of the stroke dependent damper assembly 66 may vary, the damper housing 104 and the end cap 120 may be made of a metal such as steel and the floating piston 116 may be made of a plastic such as glass reinforced polyamide. In the illustrated embodiment, the end cap 120 includes an annular shoulder 122 that overlaps with and is radially inward of the extension portion 108 of the damper housing 104. A seal 124 is positioned between extension portion 108 of the damper housing 104 and the annular shoulder 122 of the end cap 120 to create a fluid-tight fit.

The floating piston 116 lacks fluid passageways such that a distal chamber 128 is defined in the internal cavity 114 of the stroke dependent damper assembly 66 longitudinally between the floating piston 116 and the end wall 118. The stroke dependent damper assembly 66 includes a second or internal piston assembly 130 positioned inside the damper housing 104. The second piston assembly 130 includes a piston 110 that is positioned inside the internal cavity 114 of the stroke dependent damper assembly 66. The piston 110 of the internal piston assembly 130 slides longitudinally along an inner face 132 of the extension portion 108 of the damper housing 104. A proximal chamber 134 is defined in the internal cavity 114 of the stroke dependent damper assembly 66 longitudinally between the second piston assembly 130 and the proximal end 100 of the stroke dependent damper assembly 66. An intermediary chamber 136 is also defined in the internal cavity 114 of the stroke dependent damper assembly 66 longitudinally between the second piston assembly 130 and the floating piston 116.

The piston rod 34 includes a rod passage 138 extending between the first working chamber 44 and the proximal chamber 134. As a result, hydraulic fluid is free to flow through the piston rod 34 between the first working chamber 44 of the shock absorber 20 and the proximal chamber 134 in the stroke dependent damper assembly 66 along flow path 137. The second piston assembly 130 includes a second compression valve 140 and a second rebound valve 142, which together form a second valve assembly 140, 142 that controls fluid flow between the proximal and intermediary chambers 134, 136. The piston 110 of the second piston assembly 130 has one or more compression passages 144 and one or more rebound passages 146. The second compression valve 140 includes a compression disc stack 148 that is mounted to the piston 110 of the second piston assembly 130 and is positioned longitudinally between the piston 110 and the proximal end 100 of the stroke dependent damper assembly 66. Flow through the compression passages 144 in the piston 110 of the second piston assembly 130 is controlled by deflection of the compression disc stack 148. The second rebound valve 142 includes a rebound disc stack 150 that is mounted to the piston 110 of the second piston assembly 130 and is positioned longitudinally between the piston 110 and the floating piston 116. Flow through the rebound passages 146 in the piston 110 of the second piston assembly 130 is controlled by deflection of the rebound disc stack 150. The compression disc stack 148 and the rebound disc stack 150 are attached to the piston 110 with a rivet 151.

The piston 110 of the second piston assembly 130 includes a skirt 152 that extends longitudinally towards the proximal end 100 of the stroke dependent damper assembly 66 and annularly about the compression disc stack 148. At the proximal end 100 of the stroke dependent damper assembly 66, the damper housing 104 includes one of more bleed ports 154. The bleed ports 154 are open to the second working chamber 46. An orifice disc 156 with at least one notch 158 is positioned longitudinally between the base portion 106 of the damper housing 104 and skirt 152 and the skirt 152 includes an outer chamfer 160 such that a bleed flow path 162 is created via the notch 158 in the orifice disc 156 and the outer chamfer 160 in the skirt 152 that allows a limited amount of hydraulic fluid to flow directly between the second working chamber 46 and the proximal chamber 134 of the stroke dependent damper assembly 66.

The stroke dependent damper assembly 66 includes a piston retainer 164 positioned longitudinally between the end cap 120 and the second piston assembly 130. The piston retainer 164 includes an annular ring portion 166 that abuts the inner face 132 of the extension portion 108 of the damper housing 104 and a flange portion 168 that extends radially inwardly into the intermediary chamber 136 from the flange portion 168. The annular ring portion 166 is disposed in contact with and extends longitudinally between the annular shoulder 122 of the end cap 120 and the skirt 152 of the piston 110 such that the second piston assembly 130 is clamped between the piston retainer 164 and the orifice disc 156. As a result, the piston retainer 164 holds the second piston assembly 130 in place and prevents the second piston assembly 130 from moving longitudinally relative to the damper housing 104.

The stroke dependent damper assembly 66 also includes a first resilient travel stop 170 positioned in the intermediary chamber 136 between the flange portion 168 of the piston retainer 164 and the floating piston 116 and a second resilient travel stop 172 positioned in the distal chamber 128 between the floating piston 116 and the end wall 118. As will be explained in greater detail below, the first and second resilient travel stops 170, 172 act as first and second mechanical stops that help to limit the longitudinal travel of the floating piston 116 when the floating piston 116 approaches the retracted and extended positions. In the illustrated embodiment, the first and second resilient travel stops 170, 172 may be rubber O-rings; however, the first and second resilient travel stops 170, 172 could be made of any elastomeric material and do not necessary have to be annular in shape.

The end wall 118 includes a through-bore 174. The through-bore 174 extends entirely through the end wall 118 and is therefore open to the second working chamber 46. The through-bore 174 has an inner surface 176 and a through-bore diameter 178. In the illustrated example, the inner surface 176 of the through-bore 174 is cylindrical in shape such that the through-bore diameter 178 is constant; however, other shapes are considered to be within the scope of the subject disclosure where the through-bore diameter 178 may vary along a longitudinal depth 180 of the through-bore 174. Optionally, the through-bore 174 may open into a tapered depression 182 in the end wall 118. The tapered depression 182 has a funnel-like shape that faces outward towards the second working chamber 46. This configuration allows the end wall 118 to have a greater wall thickness for increased strength.

The floating piston 116 includes a metering pin 184 that is received in the through-bore 174 to define an orifice 186 between the inner surface 176 of the through-bore 174 and an outer surface 188 of the metering pin 184. Longitudinal movement of the floating piston 116 between the retracted, middle, and extended positions changes a position of the metering pin 184 in the through-bore 174, which in turn changes the size of the orifice 186. As best seen if FIG. 5, the metering pin 184 has an hour-glass shape and a cross-sectional width 190 that narrows at a waist portion 192 of the metering pin 184 such that the metering pin 184 progressively reduces an opening area (i.e., flow area) of the orifice 186 when the floating piston 116 moves away from the intermediate position. In the illustrated embodiment, the metering pin 184 has a circular cross-section such that the cross-sectional width 190 of the metering pin 184 is the diameter of the metering pin 184. However, it should be appreciated that the metering pin 184 may alternatively have a non-circular cross-section.

Figure 5:
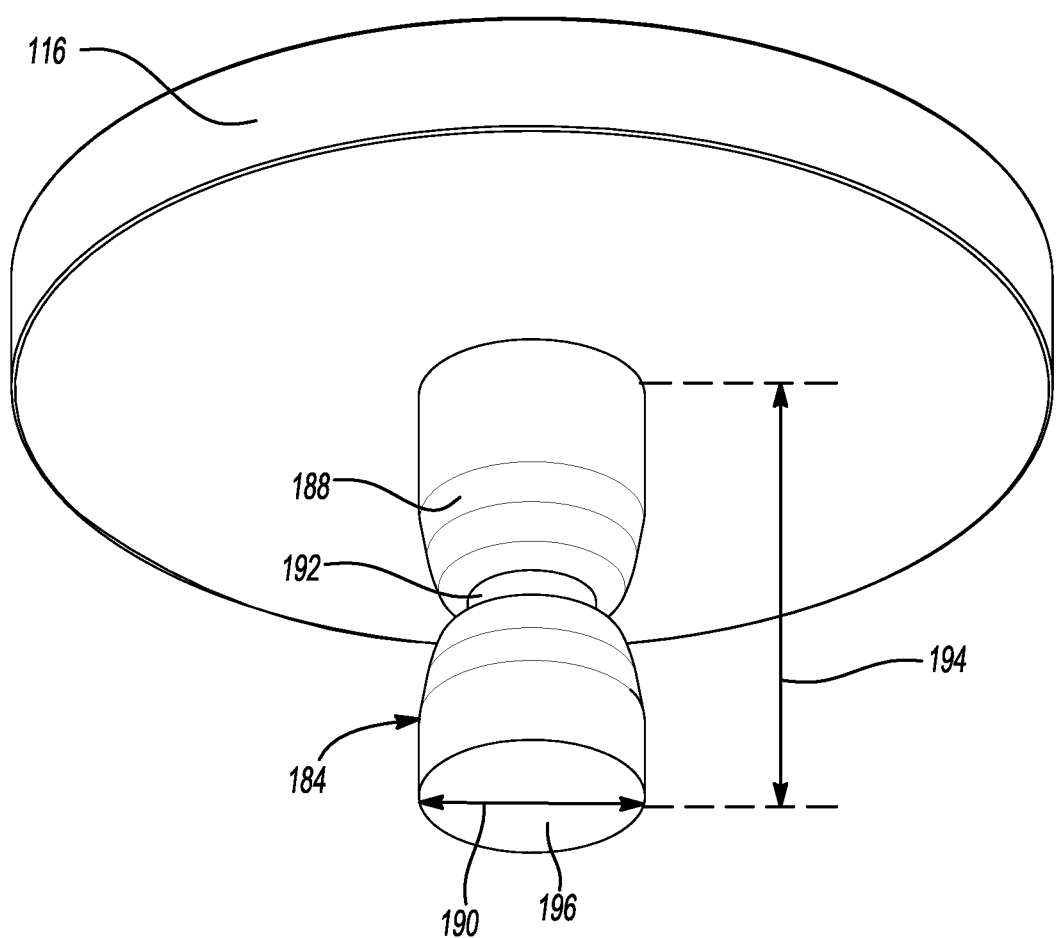
FIG. 5 is an enlarged perspective view depicting the floating piston and metering pin in the stroke dependent damper assembly of the shock absorber shown in FIG. 2.
Figure 6:
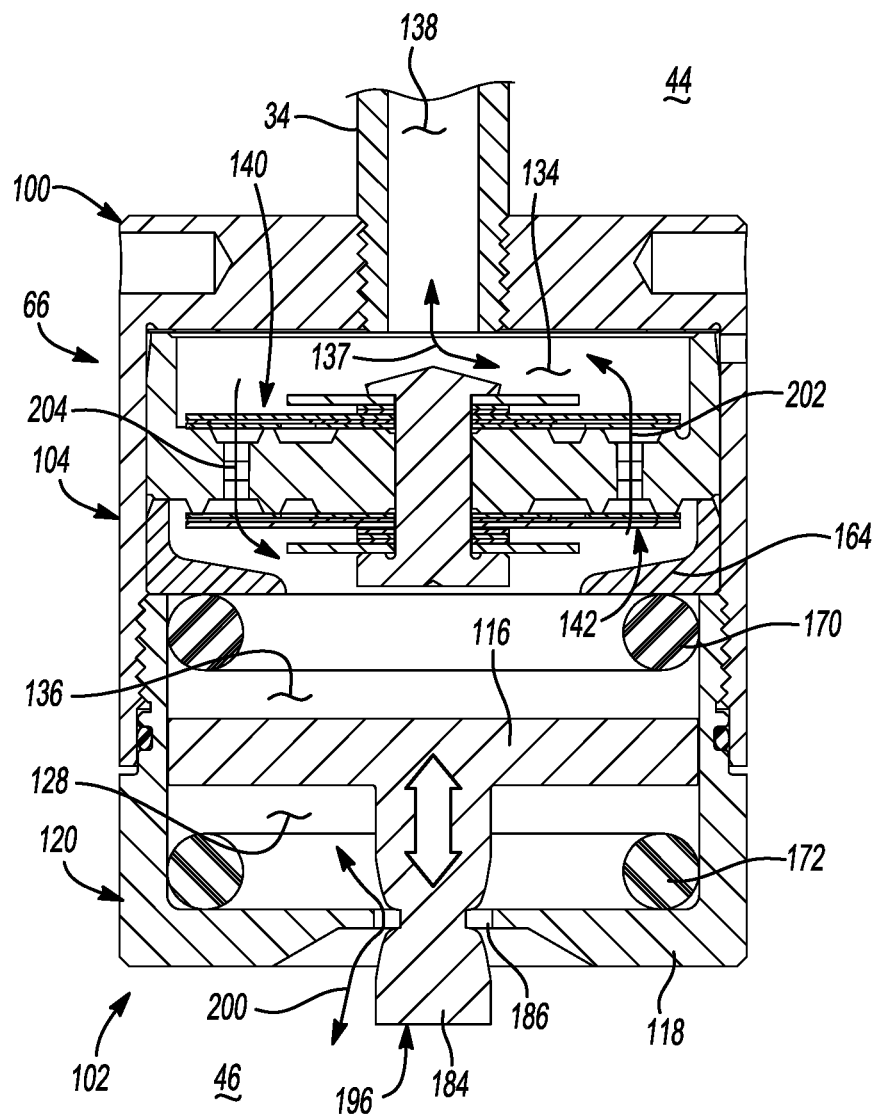
FIG. 6 is a side cross-sectional view depicting the stroke dependent damper assembly of the shock absorber shown in FIG. 2 where the floating piston of the stroke dependent damper assembly is shown in an intermediate position.
Figure 7:
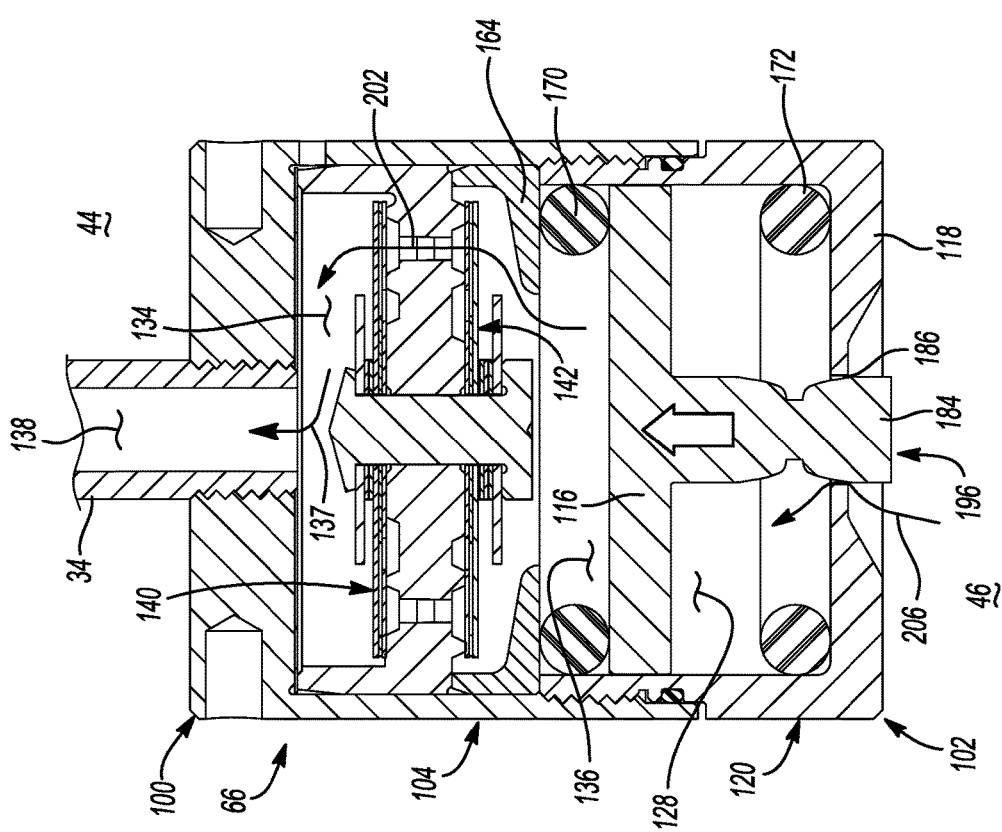
FIG. 7 is a side cross-sectional view depicting the stroke dependent damper assembly of the shock absorber shown in FIG. 2 where the floating piston of the stroke dependent damper assembly is shown approaching a retracted position.

As shown in FIG. 5, the metering pin 184 extends along a longitudinal length 194 from the floating piston 116 to a metering pin end 196. As shown in FIGS. 6-8, the metering pin 184 extends through the through-bore 174 when the floating piston 116 is in the retracted, middle, and extended positions. The metering pin end 196 projects longitudinally outwardly from the end wall 118 when the floating piston 116 is in the retracted, middle, and extended positions. The distal chamber 128 is therefore open to the second working chamber 46 via the orifice 186 when the floating piston 116 is in the intermediate position. In the intermediate position (FIG. 6), fluid flow through the orifice 186 is relatively unrestricted along flow path 200. When the floating piston 116 approaches the retracted position (FIG. 7) and extended position (FIG. 8), the longitudinal position of the metering pin 184 decreases the size of the orifice 186 and therefore restricts fluid flow. Optionally, the metering pin 184 may completely seal the distal chamber 128 from the second working chamber 46 when the floating piston 116 is in the retracted and extended positions.

The shock absorber 20 operates as a multi-stage hydraulic damper, which provides damping that varies according to stroke length. Soft damping is provided for small strokes and firm damping is provided for large strokes. As shown in FIGS. 3 and 6, when the shock absorber 20 undergoes a small stroke, the metering pin 184 remains close to the intermediate position. Hydraulic fluid can flow into and out of the distal chamber 128 through the orifice 186 along flow path 200. The flow of hydraulic fluid into and out of the distal chamber 128 causes small longitudinal movements in the floating piston 116, which results in fluid flow through the second valve assembly 140, 142 along flow paths 202, 204 depending on whether the shock absorber 20 is in compression or rebound. The hydraulic fluid also flows through the first valve assembly 62, 64, 65 during small strokes along flow paths 82, 92 depending on whether the shock absorber 20 is in compression or rebound. The two separate fluid flows through the first valve assembly 62, 64, 65 and the second valve assembly 140, 142 provide soft damping. In other words, the first valve assembly 62, 64, 65 and the second valve assembly 140, 142 work in parallel with each other during small strokes. When the shock absorber 20 undergoes a large stroke, the flow of hydraulic fluid through the second valve assembly 140, 142 is progressively reduced due to reduced fluid flow through the orifice 186. This slows the longitudinal movement of the floating piston 116 and therefore reduces fluid flow through the second valve assembly 140, 142, which results in firm damping during large strokes.

Referring now to FIGS. 3 and 7, during a compression stroke, hydraulic fluid in the second working chamber 46 is forced into the first working chamber 44 through the first valve assembly 62, 64, 65 overcoming the load required to deflect the compression valve plates 78, which opens the compression flow passage 74 in the piston body 60 (arrow 82). Hydraulic fluid in the second working chamber 46 also flows through the orifice 186 and into the distal chamber 128 (arrow 206). The hydraulic fluid in the distal chamber 128 pushes the floating piston 116 towards the proximal end 100 of the stroke dependent damper assembly 66. This forces the hydraulic fluid in the intermediary chamber 136 to flow through the compression passages 144 in the second valve assembly 140, 142 and into the proximal chamber 134 where the fluid then flows through the rod passage 138 and out into the first working chamber 44 (arrows 137, 202). The amount of fluid flow will be determined by the amount of pressure built up within the second working chamber 46 and the size of the orifice 186, which is dependent on the longitudinal position of the metering pin 184/floating piston 116. Thus, for small movements, fluid flows through both the first valve assembly 62, 64, 65 and the second valve assembly 140, 142. However, as shown in FIG. 7, as the length of the compression stroke increases, the floating piston 116 will approach the retracted position, decreasing the size of the orifice 186 between the through-bore 174 and the metering pin 184. This gradually decreases the fluid flow through the orifice 186, which gradually decreases the speed at which the floating piston 116 approaches the retracted position and the fluid flow through the compression passages 144 in the second valve assembly 140, 142 to provide a smooth transition from initially soft damping to firm damping. The dimensions of the stroke dependent damper assembly 66 can be selected to tailor the amount that the first resilient travel stop 170 is compressed when the floating piston 116 reaches the retracted position.

Referring now to FIGS. 3 and 8, during a rebound stroke, hydraulic fluid in the first working chamber 44 is forced into the second working chamber 46 through the first valve assembly 62, 64, 65 overcoming the load required to deflect the rebound valve plates 86, which opens the rebound flow passage 76 in the piston body 60 (arrow 92). Hydraulic fluid in the first working chamber 44 flows through the rod passage 138 and into the proximal chamber 134 (arrow 137). As pressure builds, the hydraulic fluid in the proximal chamber 134 flows through the rebound passages 146 in the second valve assembly 140, 142 and into the intermediary chamber 136. The hydraulic fluid in the intermediary chamber 136 pushes the floating piston 116 towards the distal end 102 of the stroke dependent damper assembly 66. This forces the hydraulic fluid in the distal chamber 128 to flow through the orifice 186 and out into the second working chamber 46 (arrow 208). The amount of fluid flow will be determined by the amount of pressure built up within the first working chamber 44 and the size of the orifice 186, which is dependent on the longitudinal position of the metering pin 184/floating piston 116. Thus, for small movements, fluid flows through both the first valve assembly 62, 64, 65 and the second valve assembly 140, 142. However, as shown in FIG. 8, as the length of the rebound stroke increases, the floating piston 116 will approach the extended position, decreasing the size of the orifice 186 between the through-bore 174 and the metering pin 184. This gradually decreases the fluid flow through the orifice 186, which gradually decreases the speed at which the floating piston 116 approaches the extended position and the fluid flow through the rebound passages 146 in the second valve assembly 140, 142 to provide a smooth transition from initially soft damping to firm damping. The dimensions of the stroke dependent damper assembly 66 can be selected to tailor the amount the second resilient travel stop 172 is compressed when the floating piston 116 reaches the extended position.

Thus, shock absorber 20 provides a soft damping setting for small strokes and a firm damping setting for larger strokes. As explained above, the multi-force damping characteristics work both in compression and in rebound or extension. In addition the multi-force damping depends on the length of the stroke, not the position of the first piston assembly 32, and provides a smooth transition between soft and firm damping to avoid unwanted switching noise. While the shock absorber 20 has been illustrated as a mono-tube shock absorber, it is within the scope of the present invention to incorporate the stroke dependent damper assembly 66 into a dual-tube shock absorber if desired.

When the size of the orifice 186 decreases as the floating piston 116 approaches the retracted and extended positions, the amount of damping progressively increases because there is reduced fluid flow between the first and second working chambers 44, 46. In addition, the speed of the floating piston 116 is hydraulically controlled to slow down gradually as the floating piston 116 approaches the retracted and extended positions, creating a soft, hydraulic stop for the floating piston 116. This reduces pressure waves inside the shock absorber 20 that would otherwise be generated when the floating piston 116 hits the first and second resilient travel stops 170, 172 at speed when the floating piston 116 reaches the retracted or extended positions. Noise, vibration, and harshness is therefore improved because such pressure waves vibrate the piston rod 34 and cause unwanted noise.

Figure 9:
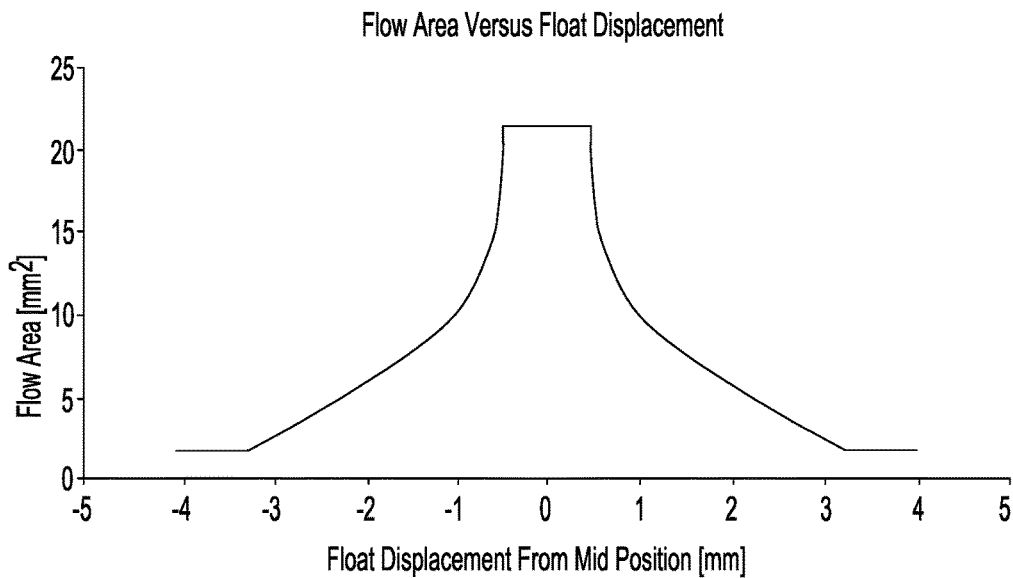
FIG. 9 is a plot illustrating the relationship between the axial displacement of the floating piston versus the flow area of the orifice.

Referring to FIG. 9, a graph illustrating the opening area of the orifice 186 relative to the axial displacement (i.e., position) of the floating piston 116 along the longitudinal axis 35 is provided. It should be appreciated that this graph is provided as an example only and that the design of the stroke dependent damper assembly 66 can be varied to provide different opening area versus axial displacement curves based on any desired operating parameters. In FIG. 9, the x-axis (i.e., the horizontal axis) represents the axial displacement of the floating piston 116 along the longitudinal axis 35. Each value listed along the x-axis is the axial displacement of the floating piston 116 along the longitudinal axis 35 relative to the intermediate position (FIG. 6) in millimeters (mm). The y-axis (i.e., the vertical axis) represents the opening area (i.e., flow area) of the orifice 186. Each value listed along the y-axis is in square millimeters (mm$^2$). When the floating piston 116 is in the intermediate position (FIG. 6), the axial displacement of the floating piston 116 is zero millimeters (mm) and the opening area of the orifice 186 is approximately 22 square millimeters (mm$^2$). When the floating piston 116 is in the retracted position (FIG. 7), the axial displacement of the floating piston 116 is minus 4 millimeters (mm) and the opening area of the orifice 186 is approximately 2 square millimeters (mm$^2$). When the floating piston 116 is in the extended position (FIG. 8), the axial displacement of the floating piston 116 is plus 4 millimeters (mm) and the opening area of the orifice 186 is approximately 2 square millimeters (mm$^2$). As shown by the curve in FIG. 9, the shape of the metering pin 184 and the through-bore 174 are constructed such that the opening area of the orifice 186 decreases non-linearly when the floating piston 116 is displaced from the intermediate position to the retracted position and from the intermediate position to the extended position.

Figure 10:
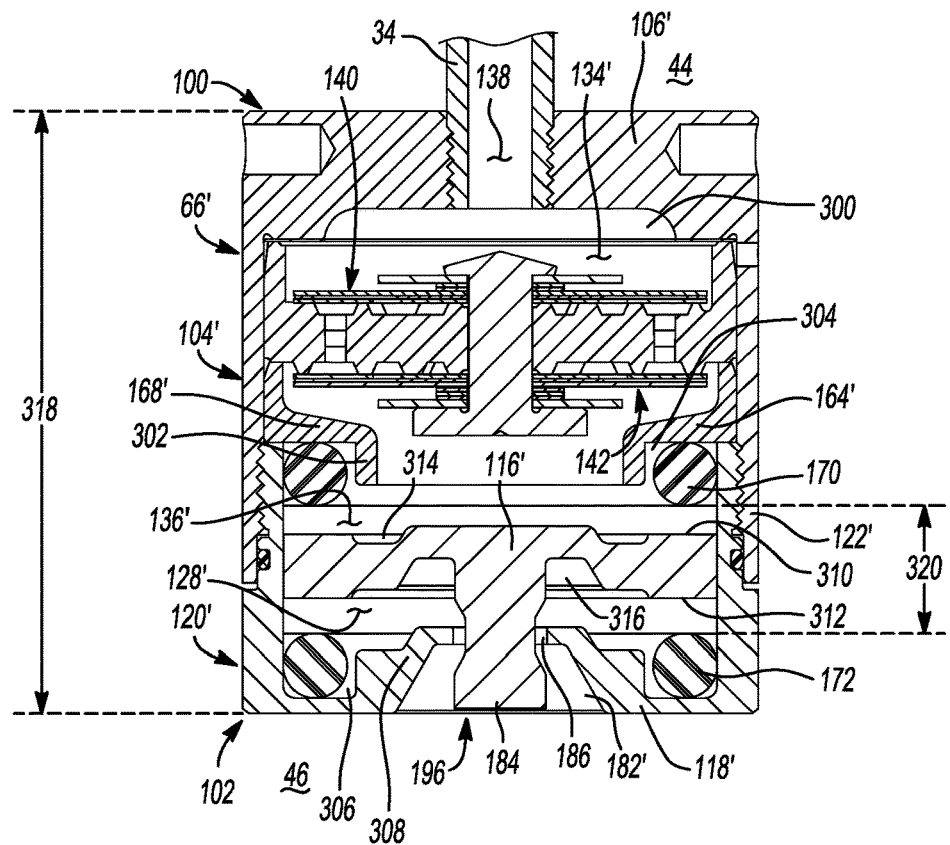
FIG. 10 is a side cross-sectional view depicting another exemplary stroke dependent damper assembly of the shock absorber shown in FIG. 2 where the floating piston of the stroke dependent damper assembly is shown in an intermediate position.

In FIG. 10, an alternative stroke dependent damper assembly 66' is illustrated. The stroke dependent damper assembly 66' illustrated in FIG. 10 is the same as the stroke dependent damper assembly 66 illustrated in FIGS. 3-8 except as noted below. The base portion 106' of the damper housing 104' has a recess 300 that increases the volume of the proximal chamber 134'. The piston retainer 164' includes an annular lip 302 that extends longitudinally from the flange portion 168' of the piston retainer 164' in a direction away from the second valve assembly 140, 142. A first annular channel 304 is formed in the intermediary chamber 136' between the annular lip 302 of the piston retainer 164' and the annular shoulder 122' of the end cap 120'. The first resilient travel stop 170 is received in the first annular channel 304. The end wall 118' of the end cap 120' is provided with a second annular channel 306 that is open to the distal chamber 128' and that receives the second resilient travel stop 172. The end wall 118' of the end cap 120' also includes a stepped portion 308 and a deeper tapered depression 182'. The floating piston 116' includes a first face 310 that contacts the first resilient travel stop 170 in the retracted position and a second face 312 that contacts the second resilient travel stop 172 in the extended position. The first face 310 of the floating piston 116' includes an annular depression 314 that provides clearance for the annular lip 302 of the piston retainer 164' when the floating piston 116' is in the retracted position. The second face 312 of the floating piston 116' includes a stepped depression 316 that provides clearance for the stepped portion 308 of the end wall 118' when the floating piston 116' is in the extended position. The stroke dependent damper assembly 66' has an axial length 318 that is measured between the proximal and distal ends 100, 102. The floating piston 116' moves longitudinally a travel distance 320, which is measured longitudinally between the first and second resilient travel stops 170, 172, when the floating piston 116' moves from the retracted position to the extended position and vice versa. In accordance with the configuration shown in FIG. 10, the axial length 318 of the stroke dependent damper assembly 66' and the travel distance 320 of the floating piston 116' are reduced in comparison with the configuration shown in FIGS. 3-8. The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the subject disclosure, and all such modifications are intended to be included within the scope of the subject disclosure.

What is claimed is:

1. A damper system for a vehicle, comprising:
   a pressure tube containing a hydraulic fluid;
   a piston rod extending within the pressure tube along a longitudinal axis;
   a first piston assembly slidably fitted in the pressure tube for movement along the longitudinal axis, the first piston assembly coupled to the piston rod and separating the pressure tube into a first working chamber and a second working chamber, the first piston assembly including a first valve assembly that controls fluid flow between the first working chamber and the second working chamber; and
   a stroke dependent damper assembly including a damper housing coupled to the piston rod, an internal cavity, a floating piston slidably received in the internal cavity for movement between a retracted position, an intermediate position, and an extended position, and a second piston assembly positioned inside the damper housing such that a proximal chamber is defined in the internal cavity of the stroke dependent damper assembly between the second piston assembly and a base portion of the damper housing and such that an intermediary chamber is defined in the internal cavity of the stroke dependent damper assembly between the second piston assembly and the floating piston, the floating piston being unbiased and free floating in the internal cavity, and an end wall that is fixed in place relative to the damper housing, the end wall including a through-bore, and the floating piston including a metering pin received in the through-bore to define an orifice between an inner surface of the through-bore and an outer surface of the metering pin that changes in size when the floating piston moves between the retracted, intermediate, and extended positions, wherein the stroke dependent damper assembly includes a first resilient travel stop positioned in the intermediary chamber between the second piston assembly and the floating piston and a second resilient travel stop positioned in a distal chamber between the floating piston and the end wall, the metering pin configured such that the floating piston contacts the first resilient travel stop in the retracted position and contacts the second resilient travel stop in the extended position.

2. The damper system of claim 1, wherein the floating piston lacks fluid passageways such that a distal chamber is defined in the internal cavity of the stroke dependent damper assembly between the floating piston and the end wall, the distal chamber being open to the second working chamber via the orifice when the floating piston is in the intermediate position.

3. The damper system of claim 2, wherein the second piston assembly includes a second valve assembly that controls fluid flow between the proximal and intermediary chambers.

4. The damper system of claim 3, wherein the piston rod includes a rod passage that extends between the first working chamber and the proximal chamber.

5. The damper system of claim 1, wherein the metering pin has a cross-sectional width that narrows at a waist portion of the metering pin such that the metering pin progressively reduces an opening area of the orifice when the floating piston moves away from the intermediate position.

6. The damper system of claim 5, wherein the metering pin has an hour-glass shape.

7. The damper system of claim 1, wherein the metering pin extends through the through-bore when the floating piston is in the retracted, middle, and extended positions.

8. The damper system of claim 1, wherein the end wall is positioned in direct contact with the hydraulic fluid in the second working chamber and forms part of an outer boundary of the stroke dependent damper assembly.

9. A damper system for a vehicle, comprising:
   a pressure tube;

a first piston assembly slidably fitted in the pressure tube for movement along a longitudinal axis, the first piston assembly separating the pressure tube into a first working chamber and a second working chamber, the first piston assembly including a first valve assembly that controls fluid flow between the first working chamber and the second working chamber; and a stroke dependent damper assembly including a proximal end coupled to the first piston assembly, a distal end opposite the proximal end, an internal cavity between the proximal and distal ends, and a floating piston slidably received in the internal cavity for movement between a retracted position, an intermediate position, and an extended position, the distal end having an end wall with a through-bore, the floating piston contacting a first stop when at the retracted position and contacting a second stop that is spaced apart from the first stop when at the extended position, the floating piston and the through-bore defining an orifice that changes in size when the floating piston moves between the retracted and extended positions to reduce the velocity of the floating piston as the floating piston approaches the retracted and extended positions.

10. The damper system of claim 9, wherein the end wall is fixed in place relative to the damper housing and is part of an end cap that is coupled to the damper housing.

11. The damper system of claim 10, wherein the end cap and the damper housing cooperate to define the internal cavity of the stroke dependent damper assembly.

12. The damper system of claim 9, wherein the floating piston is unbiased and free floating in the internal cavity.

13. The damper system of claim 9, wherein the floating piston includes a metering pin that extends longitudinally from the floating piston to a metering pin end, the metering pin end projecting longitudinally outwardly from the end wall when the floating piston is in the retracted, middle, and extended positions.

14. A stroke dependent damper assembly for attachment to a piston rod of a vehicle shock absorber having first and second working chambers, the stoke dependent damper assembly comprising:

a damper housing having a proximal end configured to be coupled to the piston rod and a distal end opposite the proximal end;

an end cap coupled to the damper housing, the end cap having an end wall with a through-bore, the end cap and the damper housing cooperating to define an internal cavity;

a floating piston slidably received in the internal cavity for movement along a longitudinal axis between a retracted position, an intermediate position, and an extended position, the floating piston being unbiased and free floating in the internal cavity; and a metering pin extending longitudinally from the floating piston along the longitudinal axis to a metering pin end, the metering pin received in the through-bore to define an orifice between an inner surface of the through-bore and an outer surface of the metering pin that changes in size when the floating piston moves between the retracted, intermediate, and extended positions, the orifice having a first size when the metering pin is at the intermediate position, the orifice having sizes less than the first size as the floating piston moves away from the intermediate position, the metering pin end projecting longitudinally outwardly from the end wall when the floating piston is in the retracted, intermediate, and extended positions.

15. The stroke dependent damper assembly of claim 14, wherein the floating piston lacks fluid passageways such that a distal chamber is defined in the internal cavity of the stroke dependent damper assembly between the floating piston and the end wall and wherein the stroke dependent damper assembly includes an internal piston assembly positioned in the damper housing such that a proximal chamber is defined in the internal cavity between the internal piston assembly and the proximal end of the stroke dependent damper assembly and such that an intermediary chamber is defined in the internal cavity between the internal piston assembly and the floating piston.

16. The stroke dependent damper assembly of claim 15, wherein the stroke dependent damper assembly includes a piston retainer positioned between the end cap and that internal piston assembly that holds the internal piston assembly in place and prevents the internal piston assembly from moving longitudinally within the damper housing, a first resilient travel stop positioned in the intermediary chamber between the piston retainer and the floating piston and a second resilient travel stop positioned in the distal chamber between the floating piston and the end wall.

17. The stroke dependent damper assembly of claim 14, wherein the end wall is fixed in place relative to the damper housing and is part of an end cap that is coupled to the damper housing.

18. A stroke dependent damper assembly for attachment to a piston rod of a vehicle shock absorber having first and second working chambers, the stoke dependent damper assembly comprising:

a damper housing having a proximal end configured to be coupled to the piston rod and a distal end opposite the proximal end;

an end cap coupled to the damper housing, the end cap having an end wall with a through-bore, the end cap and the damper housing cooperating to define an internal cavity;

a floating piston slidably received in the internal cavity for movement along a longitudinal axis between a retracted position, an intermediate position, and an extended position, the floating piston being unbiased and free floating in the internal cavity; and a metering pin extending longitudinally from the floating piston along the longitudinal axis to a metering pin end, the metering pin received in the through-bore to define an orifice between an inner surface of the through-bore and an outer surface of the metering pin that changes in size when the floating piston moves between the retracted, middle, and extended positions, the metering pin end projecting longitudinally outwardly from the end wall when the floating piston is in the retracted, middle, and extended positions, wherein the metering pin has an hour-glass shape and a cross-sectional width that narrows at a waist portion of the metering pin such that the metering pin progressively reduces an opening area of the orifice when the floating piston moves away from the intermediate position.

\* \* \* \* \*